June 9, 1942. D. C. ROCKOLA ET AL 2,285,532
PARKING METER
Filed Jan. 29, 1940 9 Sheets-Sheet 5

Inventors:
David C. Rockola
Arvid Dahlstrom
BY
Sheridan, Davis & Cargill
Attys.

Inventors:
David C. Rockola
Arvid Dahlstrom

Patented June 9, 1942

2,285,532

UNITED STATES PATENT OFFICE 2,285,532

PARKING METER

David C. Rockola and Arvid Dahlstrom, Chicago, Ill.; said Dahlstrom assignor to said Rockola Application January 29, 1940, Serial No. 316,074

13 Claims. (Cl. 194—1)

This invention relates to improvements in parking meters.

One object of the invention is to provide a parking meter mechanism whereby a coin deposited in the meter by a patron is visible through a sight opening and is moved by said mechanism along the sight opening at such velocity that the movement of the coin through a given distance or range defines a parking period of predetermined duration. Such a coin thus constitutes an indicator which indicates the elapsed portion or the remaining portion of a parking period, and may indicate also the duration that a patron may have parked his vehicle in excess of an alloted parking period. In other words, by the improved mechanism a coin inserted by a patron becomes the indicator of the parking period mechanism, and since it remains in a position of visibility during the parking period the use of spurious coins is discouraged.

Another object of the invention is to provide a mechanism, in which a single coin may be inserted by a patron in payment of the privilege of parking for a predetermined parking period, or a plurality of such coins may be inserted in payment for the privilege of parking throughout a corresponding number of successive parking periods.

An additional object of the invention is to provide a mechanism adapted to receive coins of different denominations in payment for parking privileges for periods of different duration.

Other objects of the invention relate to various features of construction and arrangement of parts which will be apparent from a consideration of the following specification and accompanying drawings, wherein.

The parking meter shown in Figures 1 to 9, inclusive, comprises a suitable casing for housing the meter mechanism, which casing may comprise a stationary casing section 10 and a movable section 11 hinged to the casing section at 12 whereby the casing can be opened up to provide access to the mechanism therein. The casing may be provided with a suitable lock (not shown) for holding the sections in closed relation. The casing may be mounted upon a post or like pedestal 13 and secured thereto as by means of a set screw 14 which is accessible only when the casing section 11 has been swung to open position. Any suitable mechanism or power means may be utilized for operating the meter, the means shown comprising a clock mechanism indicated generally by the numeral 15. The clock mechanism preferably is of the 8-day type and is provided with a winding stem 16 accessible to an attendant when a pivoted closure member 17 has been swung to open position. A locking means may be provided for the closure member if desired.

The driving mechanism comprises a driven gear 18 mounted on a shaft 19 on which is also mounted a pulley 20 over which and a companion pulley 21 passes an endless coin moving member 22. This member preferably is of relatively soft flexible material such as rubber. During the operation of the clock mechanism the coin moving member 22 is operated, the left-hand run, as shown in Figure 2, moving upwardly, while the right-hand run thereof moves downwardly.

Figures 1, 2:
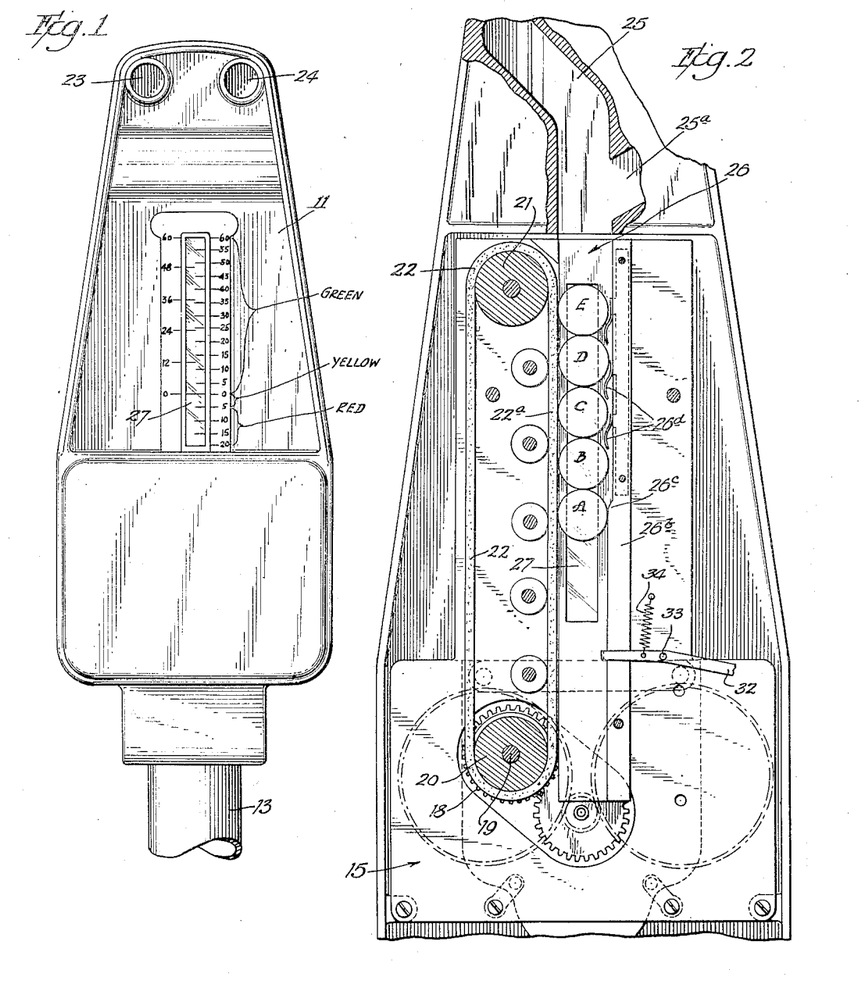
Figure 1 is an elevation of one face of a parking meter embodying the present improvements.
Figure 2 is an enlarged broken elevation partly in section with one wall of the parking meter casing removed for illustrating portions of the coin handling mechanism.
Figures 6, 7, 8, 9:
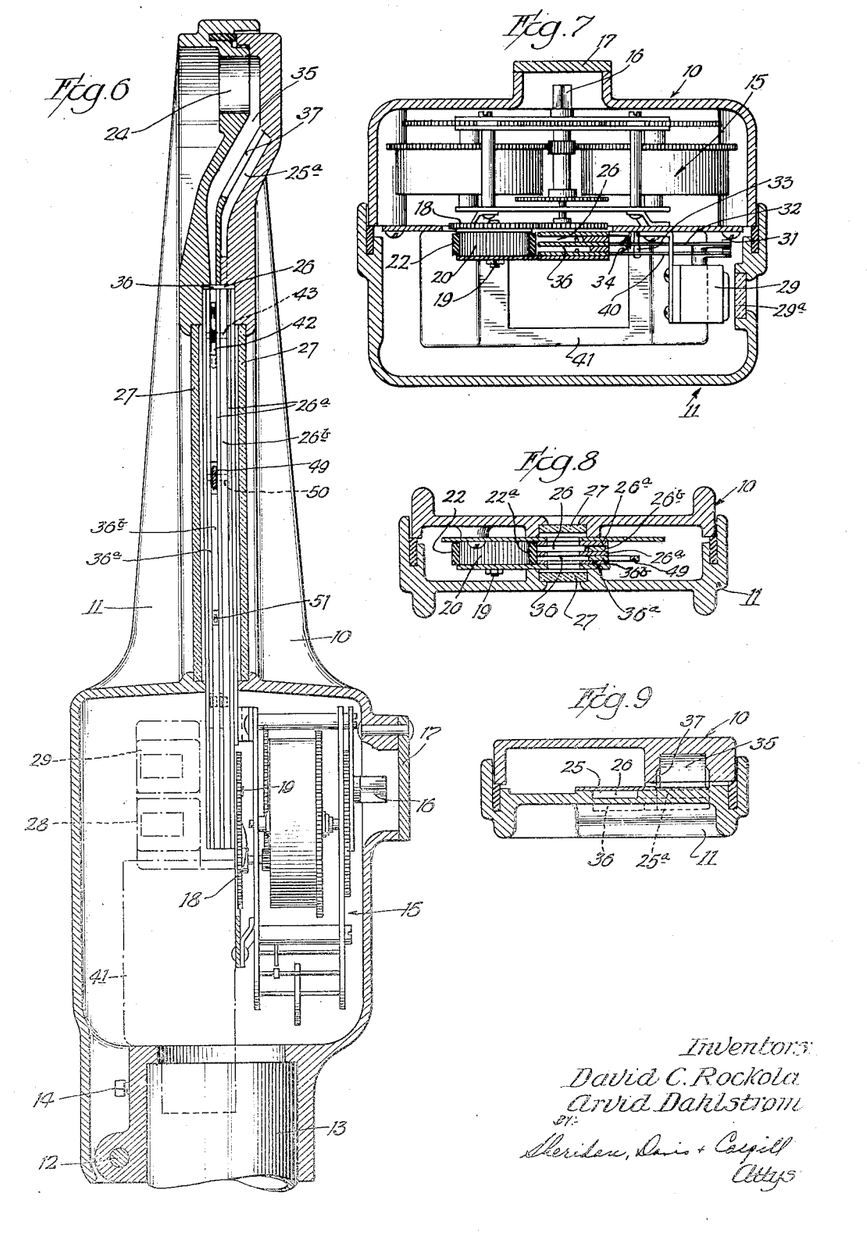
Figure 6 is a vertical sectional view taken on the line 6—6 of Figure 3.
Figure 7 is a sectional view taken on the line 7—7 of Figure 3.
Figure 8 is a sectional view taken on the line 8—8 of Figure 3.
Figure 9 is a sectional view taken on the line 9—9 of Figure 3.

As shown in Figure 1, the casing section 11 is provided with a pair of coin receiving openings 23 and 24, the former being for coins of a size smaller than the coins to be used in opening 24. For example, coins of any two suitable denominations may be employed in a meter embodying the present improvements, but the illustrative embodiments of the invention shown in the drawings and as hereinafter described are intended for use with 5 cent pieces and 1 cent pieces, or nickels and pennies; hence, opening 23 is designed for pennies, being of a smaller size, while opening 24 is designed for nickels. As shown in Figure 2, a coin chute 25 leads from the coin opening 23 into communication with the upper end of a coin passage 26 which may be formed as shown in Figure 8 by a pair of metal strips 26a suitably spaced apart at one edge by a member 26b whereby the passage 26 will accommodate pennies. This coin passage 26 is open at the edge thereof adjacent the decending run of the coin moving member 22. The distance from the outer surface of the run 22a of the member 22 to the inner vertical edge or face of the spacing member 26b is greater than the diameter of the coin in the upper portion of the passage 26. The width of this passage, however, at its lower portion is narrower, due to the provision of an elongated shoulder 26c on the member 26b as shown in Figure 2. Hence, a proper coin, as a 1 cent piece, inserted through the opening 23 will travel down the chute 25 into the communicating passage 26 down to the position of the lowermost coin shown in Figure 2, where, due to the narrowing of the passage 26 by reason of the shoulder 26c, the coin will be forced into contact with the relatively soft surface of the coin moving member or belt 22. In this narrow lower portion of the passage 26 the inner surface of member 26b constitutes a track along which the inserted coins roll or travel under contact of member 22. In the upper or wider portion of the passage 26 a plurality of thin flexible springs or coin retarding members 26d are provided for retarding the gravitational movement of an inserted coin whereby it will come to rest (except for the driving action of member 22) in the position of the lowermost coin shown in said figure.

By retarding the free gravitational movement of subsequently inserted coins, they are prevented from driving a previously inserted coin downwardly beyond its proper position.

As shown in Figure 8, the strips 26a are provided with vertical longitudinal slots which are aligned with glazed sight openings 27 formed in the opposite side walls of the casing. On the exterior of this casing along the sight openings 27 suitable scales may be provided as illustrated in Figure 1. The scale illustrated and the driving mechanism 15 in the embodiment of the invention herein shown are designed for providing a parking period of 60 minutes, or one hour, upon the payment of 5 cents by the patron, whether that sum be in the form of a 5 cent piece or 5 pennies. By inserting one or more pennies corresponding portions of the 60 minute parking period may be obtained. Thus, the lowermost coin shown in Figure 2, and for convenience indicated by the letter A, is arrested in its free descent by contact with the edge of the spacing or track member 26 and the member 22 in a position where the upper portion of the periphery of such coin is aligned with the graduation line associated with the numeral 12 which will represent that the patron who has inserted such a 1 cent piece is entitled to a 12 minute parking period. The clock mechanism is intended for continuous operation and to be wound periodically by a custodian to maintain it in operation. Hence, when a 1 cent piece is dropped to the position shown in Figure 2 its free descent is arrested, but due to the fact that the moving member 20 is in operation, the coin immediately begins to descend under the action of the run 22a of the member 22. The clock mechanism drives the member 22 at such peripheral speed that in 12 minutes the upper surface of the coin A will have moved from the scale graduation indicating 12 minutes to the zero graduation, thus indicating the termination of the parking period. If the patron contemplates parking longer than 12 minutes, he may drop a second coin B, or additional coins C, D and E, into the meter. If they are dropped in rapid succession, the coins will come to substantial rest in the positions shown in Figure 2, although it shall be understood that as soon as their free descent has been arrested in the position shown in Figure 2, they begin to move downwardly under the action of the coin moving member 22. The upper surface of the periphery of coin B will register with the parking period graduation 24, representing 24 minutes of available parking time, while coin C will register with graduation 36, coin D will register with graduation 48, and the upper surface of the periphery of coin E will register with the graduation 60. Hence upon inserting 5 coins as described, a patron will be entitled to 60 minutes parking, since the coin operating mechanism, including the coin moving member 22, operates at such velocity as to remove coin E from the position shown in Figure 2 down to the zero graduation of Figure 1 in a period of 60 minutes.

Figures 3, 4, 5:
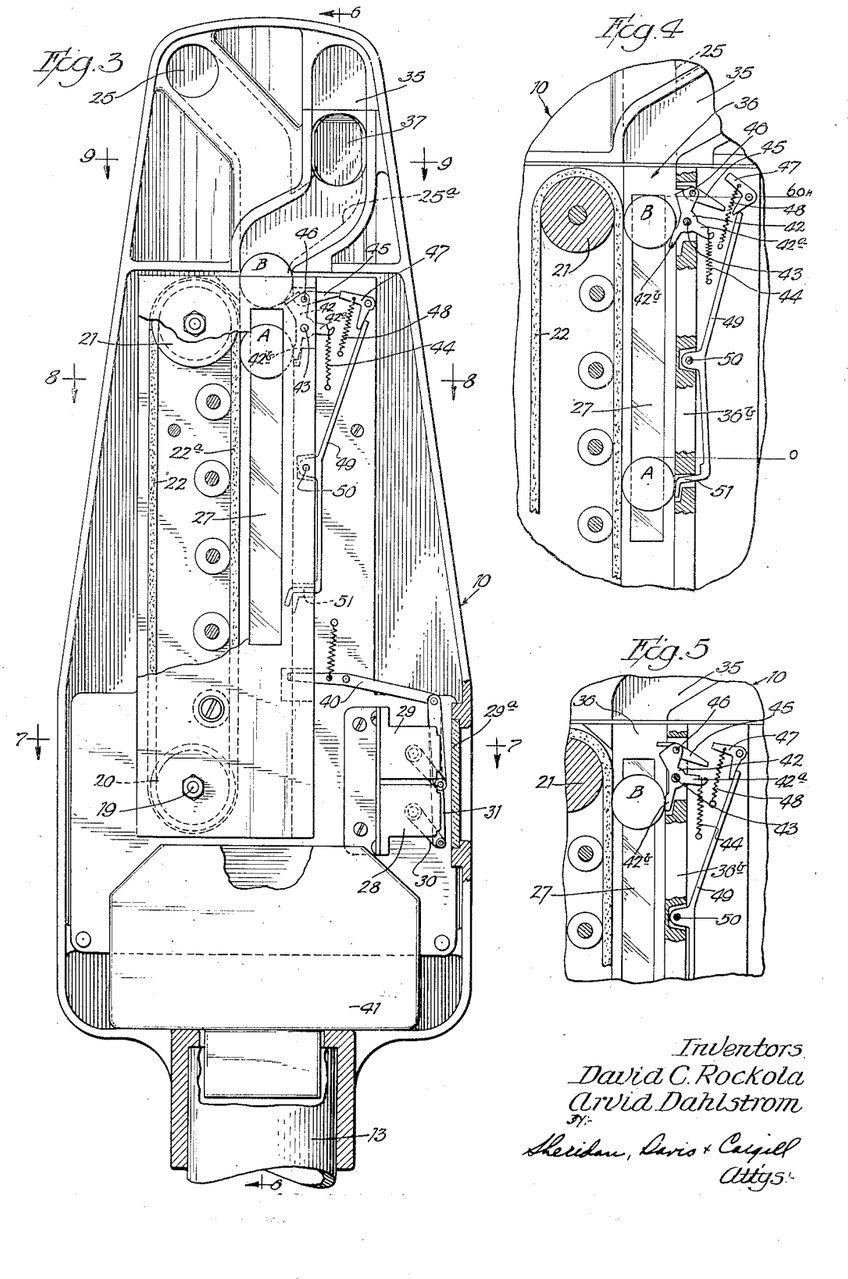
Figure 3 is a view similar to Figure 2, but illustrating mechanism for handling coins of a different denomination.
Figure 4 is a broken elevation of a portion of the mechanism shown in Figure 3, but illustrating such mechanism in a different operative position.
Figure 5 is a view similar to Figure 4 and illustrating a mechanism in an additional operative position.

In Figure 3, two coin counters or registers 28 and 29 are shown, register 28 being adapted for counting the number of 1 cent pieces inserted in the parking meter, while counter 29 is designed to record the number of nickels inserted in the meter as hereinafter described. The counters are of conventional construction and, as shown, each is provided with an operating arm 30 which, when swung counter-clockwise from the position shown in Figure 3, will actuate the counting mechanism. Arm 30 of the counter 28 is shown connected by means of a link 31 to a lever 32, which is pivoted at 33 (see Figure 2) and has its free end disposed within the path of the coins moving through the passage 26. Each coin moving through the lower portion of such passage under the driving action of the member 22 will swing the lever 32 counter-clockwise to operate the counter 28, such swinging movement taking place against the action of a spring 34.

Should a patron wish to insert a nickel in the meter in payment for a 60 minute parking period, such coin is inserted in the coin receiving opening 24, with which communicates a coin chute 35, the lower end of which, in turn, communicates with a second or branch coin passage 36 disposed adjacent the previously described coin passage 26. The coin passage 36 is located between the intermediate strip 26a and a strip 36a, as shown in Figure 8, said strips being suitably spaced apart for receiving 5 cent pieces by a spacing or track member 36b. The coin chute 35 is laterally off-set as shown in Figure 6, and in the diagonally disposed section thereof an opening 37 is provided through which coins smaller than a nickel, such as 1 cent pieces, for example, inadvertently or intentionally inserted in the coin receiving opening 24, will drop. The opening 37 communicates with a coin chute 25a, which communicates, as shown in Figure 2, with the passage 25, and hence 1 cent pieces inserted in the 5 cent receiving opening 24 will be directed into the coin passage 26 and if but one such 1 cent piece is inserted, the patron will be entitled to a 12 minute parking period only and not to a 60 minute parking privilege which is accorded to him upon the insertion of a 5 cent piece in the coin receiving opening 24.

A 5 cent piece inserted in the opening 24 moves downwardly through passage 35 and, due to its size, slides across the opening 37 and enters the upper end of the coin passage 36. Such an inserted coin has its free gravitational movement arrested at the upper end of the passage 36 by reason of the contact of such coin with the upper portion of the run 22a of the member 22. Such free gravitational movement is arrested at the position where the upper portion of the periphery of the 5 cent piece will register with the graduation of the scale indicating a 60 minute parking period.

As shown in Figure 8, the strip 36a is provided with a longitudinal slot which registers with the corresponding slot in members 26a and also with the glazed sight openings 27, one of which is preferably provided in each wall of the casing whereby a coin in either of the two coin passages may be observed from either side of the meter.

From the foregoing description it will be seen that a 5 cent piece inserted in the meter and coming to rest in registration with the 60 minute graduation of the scale will be moved downwardly by the member 22 to the zero graduation during an interval of 60 minutes. The coin inserted thus moves at a predetermined velocity through a given distance for indicating an allotted parking period, the coin constituting in effect the indicator of the meter.

As an inserted 5 cent piece is moved to the lower portion of the passage 36, it will engage and operate a lever 40 corresponding to lever 32 for operating the coin counter 29. The coins drop from the lower ends of the respective passages 26 and 36 into a suitable receptacle or receptacles 41 which may be located in the bottom of the meter case. The number of inserted coins of each denomination will be indicated by the respective counters 28 and 29, which counters are visible by reason of the provision of a glazed sight opening 29a.

The use of the counters discourages the theft of coins by an attendant whose duty it is to remove the coins periodically and to wind the clock mechanism or otherwise service the meter, and who, for those purposes, is provided with a key for obtaining access to the interior of the meter casing.

In some municipalities, or in some sections thereof, parking periods of more than one hour may sometimes be permitted, and to enable the present parking meter to register parking periods of greater duration than the 60 minute period above referred to as an example of a unit parking period, the mechanism shown in Figures 3, 4 and 5 may be employed if desired. In these figures a coin arresting member 42 is shown pivoted at 43 adjacent the coin passage 36. This member 42 is provided with an arm 42a to which is attached a spring 44 which tends to swing the member 42 in a clockwise direction, as shown in the figures. The member 42 is provided with an arm 42b which extends normally into the passage 36 whereby a coin moving into said passage will, upon engagement of the coin by the coin moving member 22, swing the member 42 in a counter-clockwise direction against the action of the spring 44. The upper end of member 42 is provided with a lever 45 which is pivoted to the member 42 at 46. The member 45, being pivoted off center, is unbalanced and tends to swing clockwise about its pivot 46 from the position shown in Figure 3 to the position shown in Figure 4. When no coin is in contact with the member 42, the arm 42b thereof projects into the passage 36 in the position shown in Figure 4. When a coin has been dropped into the passage 35, it comes to rest in the position of the upper coin B shown in Figure 4, in which position it will be noted that the coin is in driving relation with reference to the member 22. The movement of the driving member causes the coin to move downwardly and thus swing the member 42 counter-clockwise against the action of the spring 44. The member 42 thus does not interfere with the progress of the coin down the coin passage 36 in accordance with the driving action of the member 22 except when there is another coin in a particular position in the passage, as is about to be described.

Where a parking patron wishes to pay for two parking units of time, for example, two hours, he may insert two coins successively in the passage 35. The first coin will come to rest in the position of coin B as shown in Figure 4, that is, in a position where the upper periphery of the coin registers with the graduation on the scale indicating that the patron is entitled to 60 minutes parking time. The member 22 which, it will be understood, is being driven constantly, moves the coin downwardly from that arrested position and thus will swing the member 42 counter-clockwise, thereby moving the left-hand end of lever 45 into the coin passage 36 and for the purpose of arresting the second inserted coin in the position occupied by coin B in Figure 3. The second coin B, in engaging the left-hand end of lever 45, swings the lever to the horizontal position shown in Figure 3, whereby the right-hand end of said lever will be in abutting relation with an arm of a dog or detent 47. The detent 47 is normally retained in the position shown in Figure 3 by a spring 48. This detent may be moved pivotally in a clockwise direction by a lever 49 which is pivoted at 50 and which has a lower end 51 which projects into the coin passage 36. Due to the engagement of the lever 45 with the dog 47 as shown in Figure 3, the member 42 is retained in the position shown in Figure 3 after the first inserted coin A has moved downwardly from the position shown in said figure; that is, the member 42 remains in the position shown in said figure, notwithstanding that coin A has moved out of engagement with the arm 42b. When coin A, however, of Figure 3 has been moved by the member 22 downwardly to the position wherein it engages the end 51 of the lever 49, as shown in Figure 4, member 49 is swung counter-clockwise by the movement of the coin and thus swings detent 47 clockwise to the position shown in Figure 4, whereupon the spring 44 swings the member 42 from the position shown in Figure 3 to the position shown in Figure 4. The coin B is thus released from the arrested position whereby the same drops into driving relation with the member 22 and begins to move downwardly under the driving action of member 22. The release of the second inserted coin, however, does not occur until the first coin A has tripped the coin arresting mechanism as above described, which occurs when the first inserted coin A has reached the zero position on the scale. The first coin thus affords the patron 60 minutes parking and upon the expiration of that period the second coin is released and begins its timing movement to accord the patron another 60 minutes parking period.

If it be assumed that the patron does not require the full two hours for which he has paid, or if it be assumed that he has inserted only one coin and has left the parking space before the expiration of his parking period, a second patron who wishes to utilize that space may insert a 5 cent piece in the meter, but that coin will not be arrested in the position of coin B of Figure 3, since the last inserted coin of the previous patron will presumably have moved out of the position of coin A in Figure 3. Hence, where a patron inserts a coin before a previously inserted coin has traveled the full length of the parking period range, he does not get the benefit of the balance of the parking period paid for by the previous patron. A second coin must be inserted in the meter immediately after the first coin has been inserted, or before the first coin has been moved downwardly out of engagement of the arm 42b by the member 42. The period during which coin A will hold coin B out of driving relation with the member 22 is dependent on the length of arm 42b and such period may be but a few seconds.

By the mechanism described above, it will be seen that the improved parking meter makes use of an inserted coin as an indicator by causing such inserted coin to move at predetermined velocity along a sight opening and that where desired coins of two denominations may be employed for indicating the elapsing of a predetermined unit of parking time, or two of such units, or by the use of coins of smaller denominations, fractional parts of such time unit may be indicated.

In Figures 10 to 14, inclusive, a second modification of the parking meter is illustrated. In these drawings the casing is indicated by the numeral 52, and is provided with any suitable operating means such as a clock mechanism 15 of the type above described, which operating means actuates a coin moving means 53 corresponding to member 22 of the above described modification, except that it is shown as being of greater length. The greater length is necessary by reason of the fact that the peripheral velocity of member 53 is assumed to be the same as that of member 22 and the graduated sight openings 54 are of such length as to provide visibility of an operated coin through a period of two parking time units; for example, two hours. In this form of the invention an opening 55 may be provided for receiving a small coin such as a 1 cent piece which gravitates through a chute 56 to an appropriate coin handling mechanism, such, for example, as the mechanism shown in Figure 2, which mechanism is located with reference to the coin moving run 53a of the member 53 whereby a 1 cent piece deposited in the chute 56 will have its free downward movement arrested in the position corresponding to the coin A of Figure 2, that is, at a position with reference to the graduated sight openings which will indicate a 12 minute parking period. A second opening 57 for coins of larger denominations, such as 5 cent pieces, is also provided, and communicating with which is a coin chute 58 having branch chute 58a, the former being arranged to direct an inserted coin into the upper end of a coin passage 59, while branch chute 58a is arranged to conduct similar coins from the chute 58 into a second coin passage 60, to a position in said passage wherein the coin will register with the 60 minute or one hour graduation of the scale shown in Figure 10. Chute 58 communicates with a by-pass 61 which in turn communicates with the coin chute 56, the means affording such communication being an opening 62 through which 1 cent pieces inadvertently or intentionally inserted in the coin receiving opening 57 will gravitate into the lower end of chute 56 and thus be deposited in the 1 cent coin passage 63. This coin passage 63 is thus the passage for receiving 1 cent pieces, or the smaller size coins. A spring 64 is provided for deflecting the 1 cent pieces from the passage 58 into the by-pass 61, the opening 62 being of insufficient vertical dimensions to allow the larger 5 cent pieces to be deflected therethrough.

Figure 14:
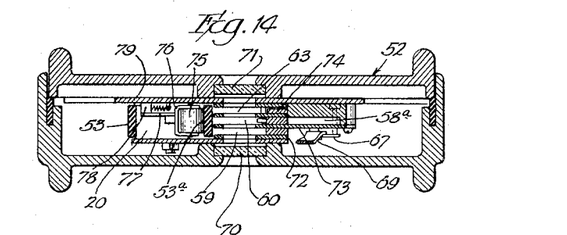
Figure 14 is a section taken on the line 14—14 of Figure 11.

For the purpose of explanation, let it be assumed that there is no coin in either the 5 cent coin passages 59 or 60. A 5 cent piece inserted in opening 57 will gravitate down chute 58, thence into branch chute 58a which so communicates with passage 60 that the coin will make contact with the coin moving member 53 at a point where the upper periphery of the coin will initially register with the graduation marker 60. The coin will thence be moved gradually downwardly by the coin moving member 53 for timing a parking period. When a 5 cent piece has thus been inserted in the meter, as just above described, and such coin occupies the position of coin A in Figure 11, it will be seen that such coin will have swung an arm 65 counter-clockwise about a pivot 66, which movement of the arm will have swung a lever 67 in a similar direction, the arm and lever being relatively fixed. Such swinging movement of the arm 65 against the action of a spring 68 will swing lever 69, which is pivoted at 69a, from the dotted line to the full line position shown in Figure 11, whereby a second coin inserted in the opening 57, if of proper denomination, will gravitate across the upper end of the branch chute 58a by reason of the bridging member 69b carried by the lever 69, and will pass into the upper end of the coin passage 60 where, upon engagement with the belt 53, its free descent will be arrested in a position to indicate that the depositor is entitled to 120 minutes parking. In other words, the coin will be arrested in the position of the upper coin B shown in Figures 10 and 11. Both such inserted coins will be visible from either side of the meter by reason of the glazed sight openings 70 and 71 as shown in Figure 14 for the reason that the dividing members 72, 73 and 74 which define the coin passages 59, 60 and 63 are provided with aligned vertical slots as shown in Figures 11 and 14.

Figure 10:
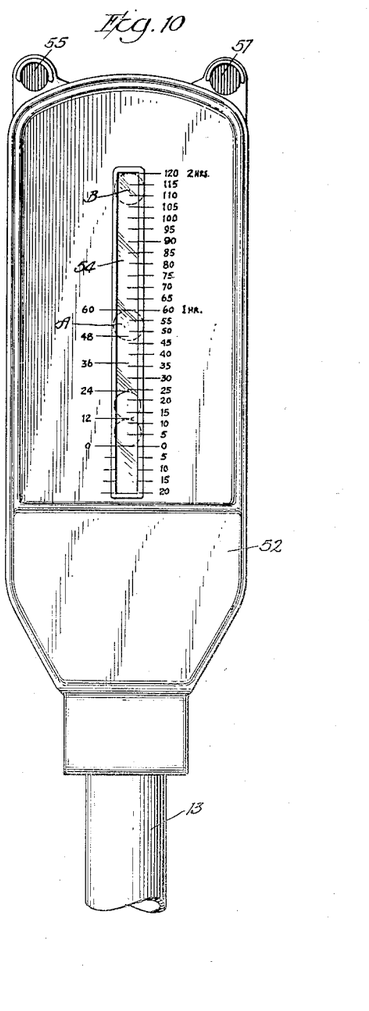
Figure 10 is an elevation of a parking meter embodying a modified coin handling mechanism.
Figure 11:
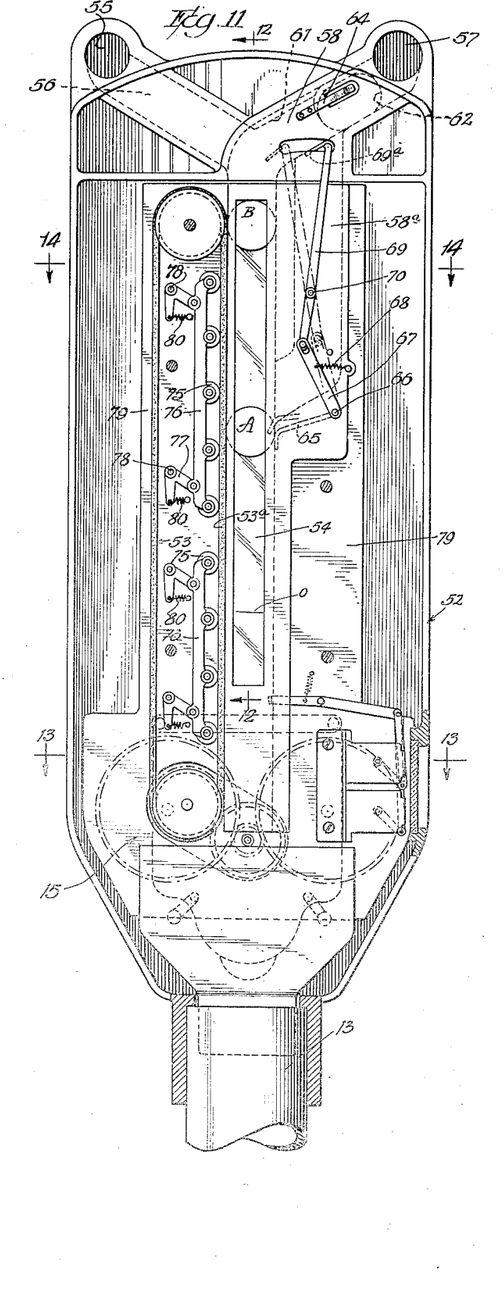
Figure 11 is an elevation partially in section, with a portion of the casing removed for illustrating portions of the coin handling mechanism of the meter shown in Figure 10.
Figure 12:
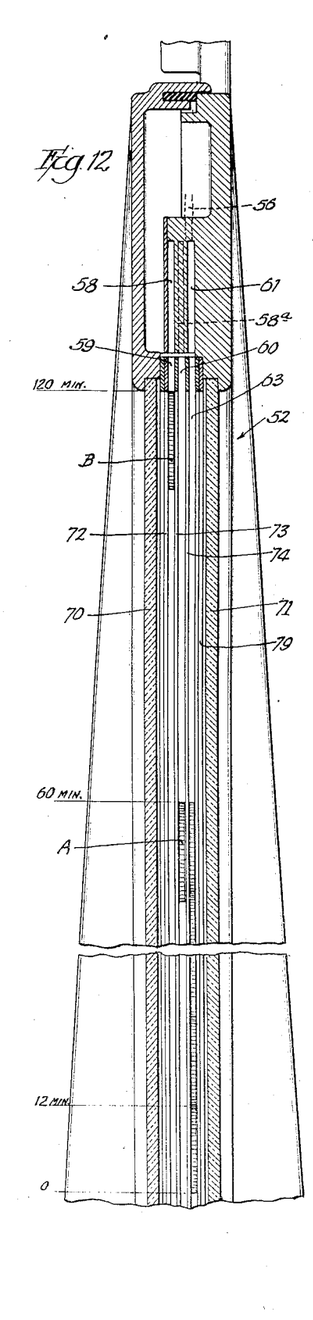
Figure 12 is a sectional view taken on the line 12—12 of Figure 11.
Figure 13:
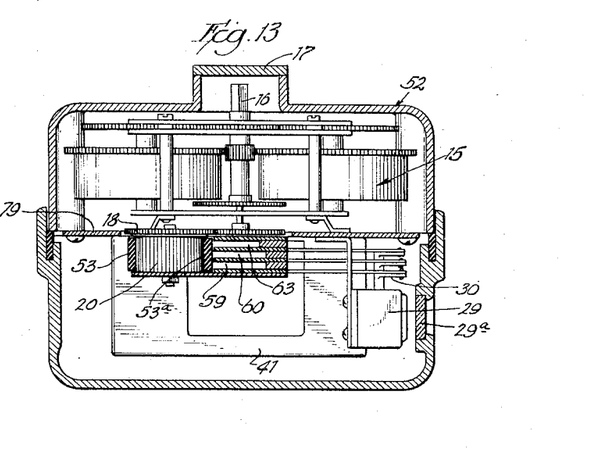
Figure 13 is a sectional view taken on the line 13—13 of Figure 11.

If the second coin B is not inserted in the opening 57 until the first coin A has been moved downwardly out of contact with the end of the arm 65, which normally extends into the passage 60, such second coin will be directed into passage 59 and to the position occupied by coin A in Figures 10 and 11. The reason why such result occurs is that upon movement of the first coin out of contact with the arm 65 the spring 68 restores the lever 67 to the dotted line position and swings lever 69 also to the dotted line position and thus removes the bridging member 69b from its bridging position in the upper end of the branch chute 58a. Hence, should a patron leave his parking space before the expiration of the one hour parking privilege for which he has paid and a second patron should insert a coin in the receiving opening 57, it will be directed to the position of coin A in Figures 10 and 11. He will thus be entitled only to the parking time for which he has paid.

In this modification of the invention the run 53a of the coin moving member 53 is held in the vertical position shown wherein it is adapted to engage the peripheries of coins in the respective coin passages, by means of a plurality of rollers 75. These rollers in the form of the invention illustrated are arranged in two groups, the upper group being carried by a member 76 which is held in a position parallel with the run 53a by belt crank levers 77 pivotally mounted at 78 to a supporting plate 79 (see Figure 14) and each provided with a spring 80 which urges the rollers with suitable tension against the rear surface of the run 53a of the belt. Rollers 75 of the lower group are similarly mounted and the parts are designated by like reference characters.

Figure 15:
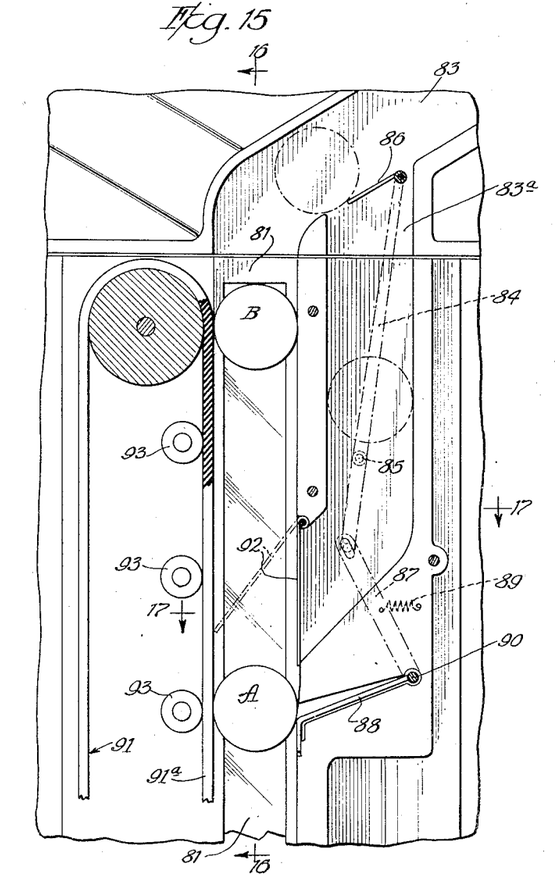
Figure 15 is an enlarged broken elevation of a portion of a modified mechanism.
Figure 16:
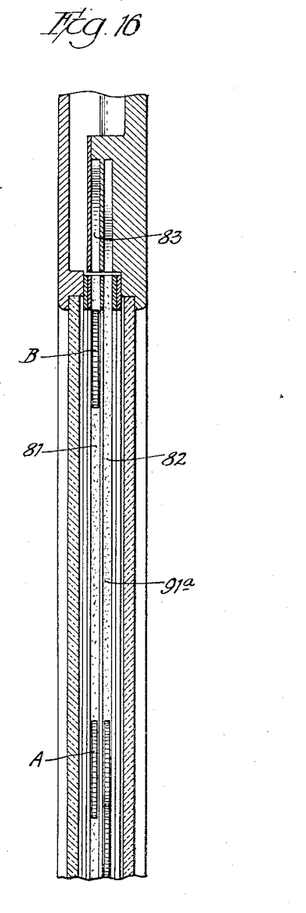
Figure 16 is a sectional view taken on the line 16—16 of Figure 15.
Figure 17:
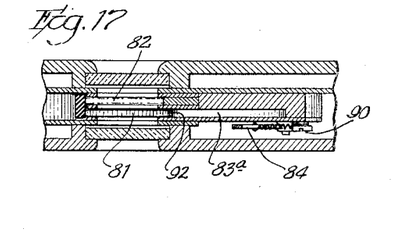
Figure 17 is a broken sectional view taken on the line 17—17 of Figure 15.

The form of the invention shown in Figures 15 to 17, inclusive, is generally similar to the form shown in Figures 10 to 14, except that for handling coins of two denominations but two coin passages are provided, coin passage 81 being for the larger size coins, such as 5 cent pieces, while the coin passage 82 is for smaller coins such as 1 cent pieces. In this form of the invention the mechanism for handling the 1 cent pieces may be the same as that shown in Figure 2.

The coin chute for receiving the 5 cent pieces in Figures 15 to 17 is designated by the numeral 83, communicating with which is a branch chute 83a. Adjacent the branch chute 83a is a lever 84 which is pivoted at 85 to any suitable support and which carries at its upper end a bridging member 86 which is movable to and from a position over the upper end of the chute 83a. The lower end of the lever 84 is connected to a lever 87 which at its lower end carries an arm 88, the inner end of which normally projects into the coin passage 81 as in the modification illustrated in Fig. 11. A spring 89 tends to swing the lever 87 about its pivot 90 in a clockwise direction and thus tends to move the bridging member 86 counter-clockwise out of bridging relation with respect to the upper end of the branch chute 83a, whereby a coin inserted in the coin receiving opening corresponding to opening 57 of Figure 11 will drop from chute 83 into branch chute 83a and enter the coin passage 81 and have its free descent arrested by engagement with the coin moving member 91 and with the inwardly projecting end of the arm 88. In moving into such position it will swing a light weight chute closure member 92 to the dotted line position shown in Figure 15. As the free descent of the coin is so arrested, it is disposed in driving relation with the run 91a of the coin moving member 91 and as it starts downwardly under the driving action of the member 91 it deflects the arm 88 from its above described position to the full line position shown in Figure 15. Such a coin will then be in or adjacent the position of coin A in said figure. While the member 88 is held by coin A in the position shown, the bridging member 86 will be in bridging relation with the upper end of the branch chute 83a and hence a second coin of proper denomination traveling through chute 83 will enter the upper end of the passage 81 and will have its free descent arrested by contact with the run 91a of the driving member 91 in the position corresponding to that of the coin indicated by letter B in Figure 15. Such coin B will, of course, immediately start its downward descent under the action of the coin moving member and will require two units of parking time in moving from its initial position to the zero position, whereas but one parking period unit is required for the movement of the first inserted coin A from its indicated position to zero position.

In moving down the passage 81, the upper coin B will roll over the lower end of the branch chute 83a by reason of the provision of the closure member 92. In this form of the invention the operating run 91a of the member 91 is shown as being supported in coin moving position by a plurality of rollers 93.

It will thus be seen that in this form of the invention also a patron may insert two coins to pay for two units of parking time, if desired, and also that should a patron leave his parking place shortly before his parking period has expired a coin thereupon inserted by a second patron will gravitate to the position of the coin A of Figure 15 which will, of course, entitle him to but one unit of parking time; for example, one hour. It is only when a second coin is inserted in the meter before the first inserted coin has moved out of engagement with the arm 88 that a second inserted coin will be directed into the upper end of the coin passage 81 to the position corresponding to that of coin B of said figure.

In the form of the invention shown in Figures 18 to 25, inclusive, suitable operating means, such as a clock mechanism 95, is carried within a casing 95a which is secured to one side of the meter casing 96 as by means of mounting studs 97. The operating means 95 drives a shaft 98 on which is mounted a disc 99 and to the outer periphery of the latter is secured a rim or felly member 100 around which extends a coin engaging and moving member 101 which may, in fact, be a rubber belt of the type described in connection with the foregoing modifications of the invention. The member 101, however, does not move relatively to the felly member 100. The casing 96 is provided with two coin receiving openings 102 and 103, the former for small size coins, such as pennies, and opening 103 for coins of a different denomination, such as nickels. Communicating with the coin receiving opening 102 is a coin passage 104 having a lower portion or arcuate shape which is disposed adjacent a portion of the periphery of the member 101 and of a width such that a 1 cent piece will move down the passage until the coin registers with the graduation 12 of the dial 105 indicating that the deposit of such coin entitles the patron to a parking period of 12 minutes. A second coin deposited immediately after the deposit of the first coin will register with the graduation indicating a 24 minute parking period, etc. In this 1 cent coin passage 104 suitable coin retarding means (not shown) such as the spring members 26d of Figure 2 may be employed if desired. In this form of the invention, as in the preceding forms, the peripheral velocity of the coin moving member 101 is such as to move a coin through the arc lying between zero graduation and the graduation indicated by the numeral 60 on the scale in a period of one hour. Hence, if five 1 cent pieces are inserted in the 1 cent coin receiving opening the patron will be entitled to a 60 minute parking period in the same manner as he would had he inserted a 5 cent piece in the appropriate coin receiving opening.

Figures 18, 19, 20:
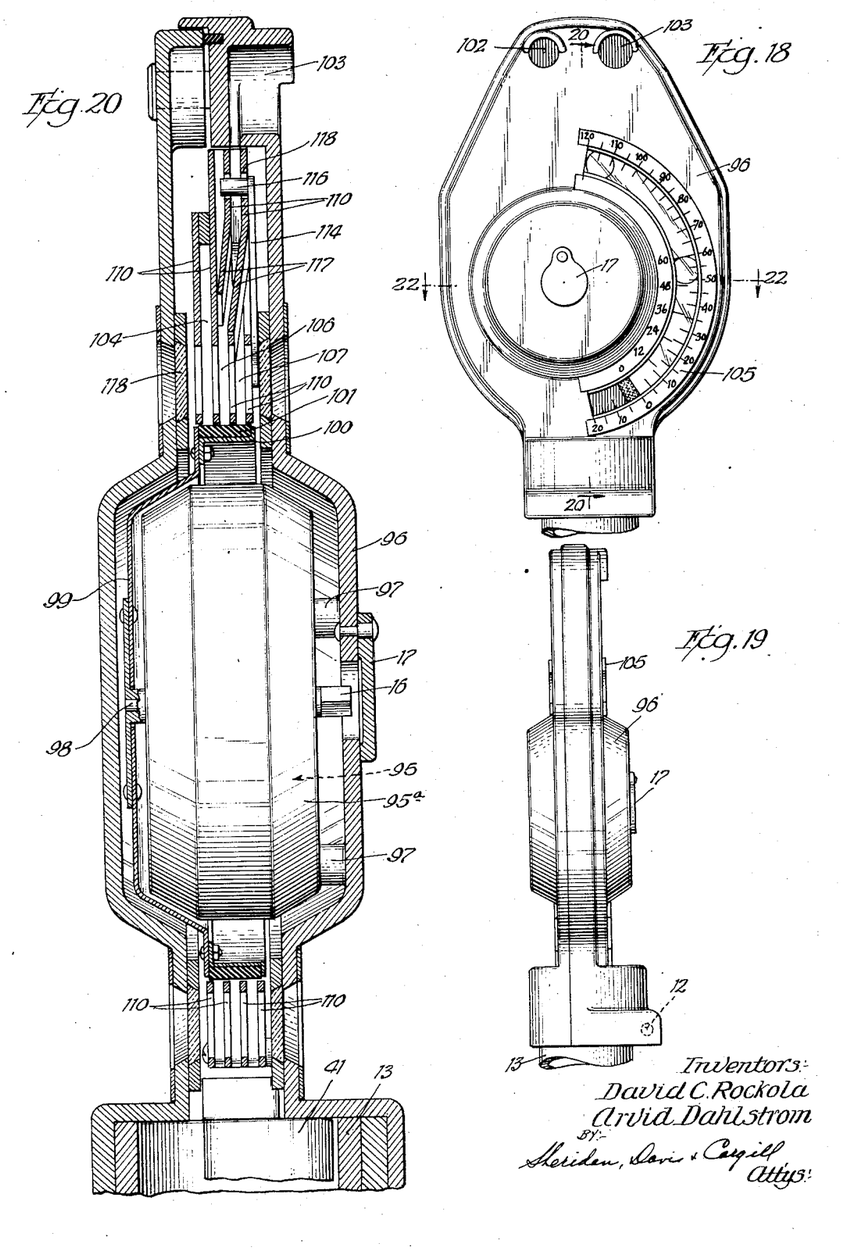
Figure 18 is an elevation of a parking meter embodying a further modification of the invention.
Figure 19 is a side elevation of the meter shown in Figure 18.
Figure 20 is an enlarged elevation, partly in section, taken along the line 20—20 of Figure 18.
Figure 21:
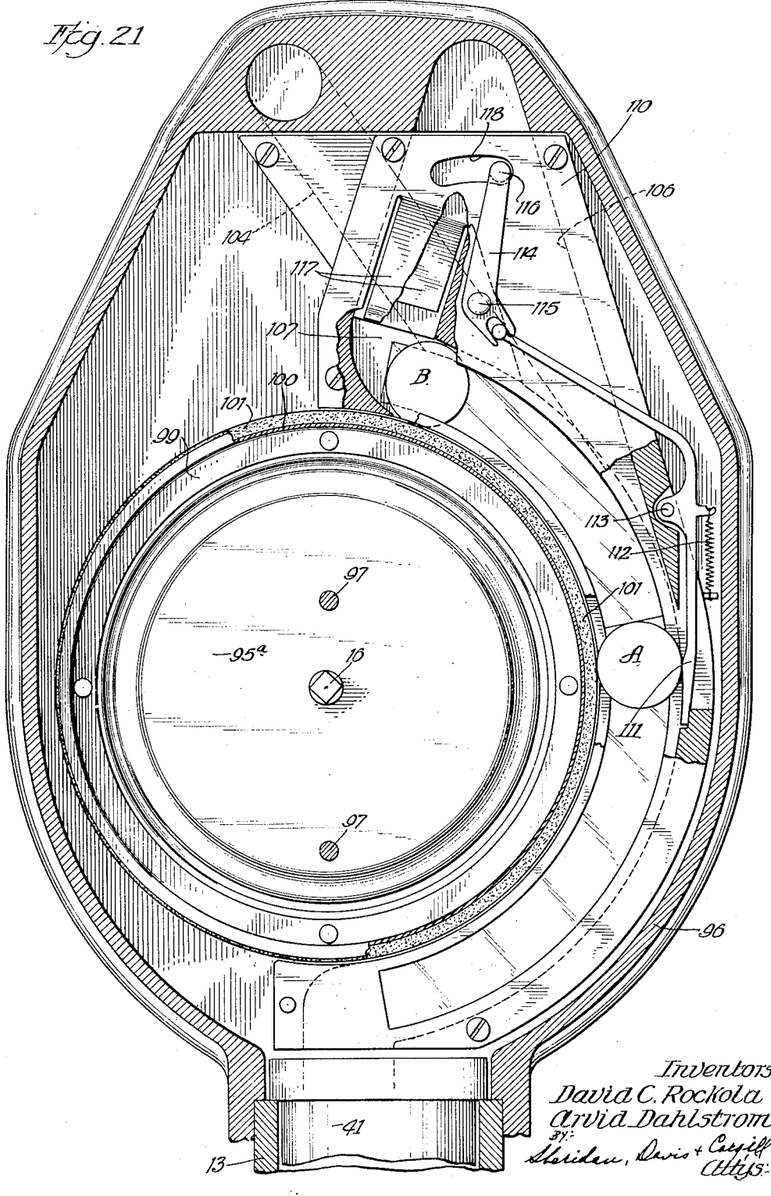
Figure 21 is an enlarged vertical sectional elevation of the meter shown in Figures 18 to 20 and illustrating the coin handling mechanism.
Figure 22:
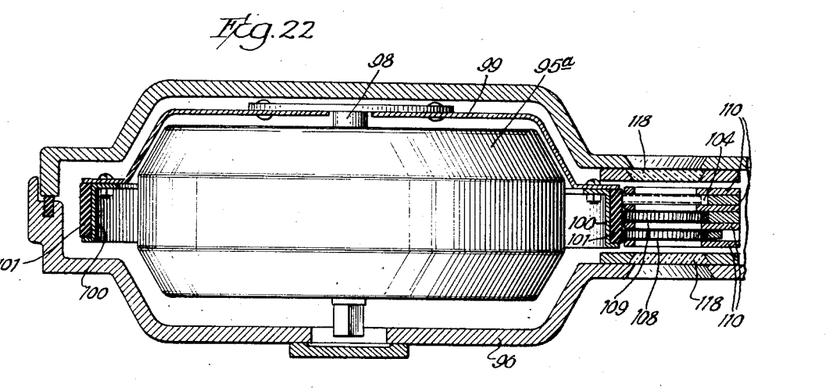
Figure 22 is a horizontal sectional view taken on line 22—22 of Figure 18 and illustrating part of the mechanism in plan view.
Figures 23, 24, 25:
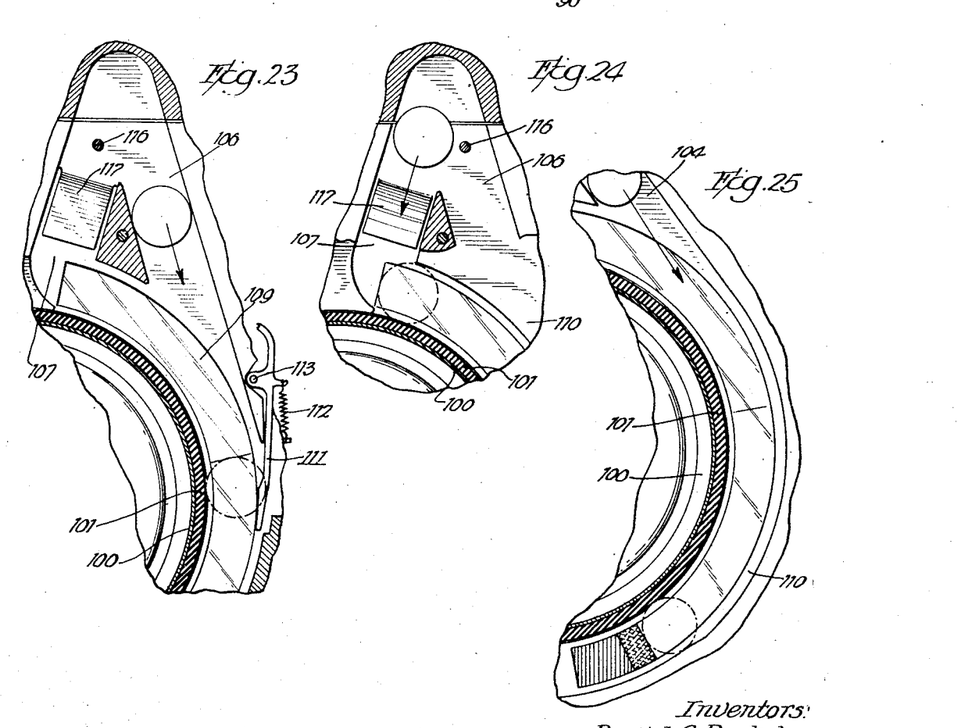
Figure 23 is an enlarged broken sectional view illustrating the direction of travel of an inserted coin to a starting position for indicating a parking period of a given duration.
Figure 24 is a similar view, but illustrating the direction of travel of a similar coin to a starting position for indicating a parking period of greater duration.
Figure 25 is a sectional view illustrating the direction of travel of a coin during a period, the duration of which is different from that of the coins illustrated in Figures 23 and 24.

Communicating with the 5 cent receiving opening 103 are two branch chutes 106 and 107. In alignment with the lower ends of the branch chutes there are communicating coin passages 108 and 109, respectively, each for receiving 5 cent pieces. These passages and the passage 104, as in the previously described modification, may be defined by spaced members 110 suitably mounted within the casing 96. When a 5 cent piece is inserted in the meter it travels downwardly through branch chute 106 into the coin passage 108, and its free downward descent is arrested by engagement with the lower end of a spring pressed lever 111, the position of such an arrested coin being indicated by the coin designated by letter A in Figure 21. The upper edge of such coin registers with the graduation 60 of the scale 105 and hence indicates that the patron is entitled to 60 minutes parking period. The coin so arrested is, of course, in contact with the constantly moving coin moving member 101, due to the width of the passage, and from the position of arrest it moves downwardly through the coin passage 108 under control of said member 101. A coin in the position of coin A of Figure 21 contacts a member 111 and holds it in the position shown in said figure until the coin has advanced out of contact with the lower end of said member whereupon a spring 112 swings the member 111 about its pivot 113 and causes the upper end of the lever to swing clockwise and to swing a lever 114 counter-clockwise about its pivot 115. The upper end of member 114 carries a coin deflecting pin 116; hence, whenever the lower end of the lever 111 has been freed by an inserted coin, a subsequently inserted coin will be directed down the coin chute 106 and have its free movement arrested in the position of coin A of Figure 21. Should a second coin, however, be inserted in the opening 103 before coin A has moved out of contact with the member 111, the coin deflecting pin 116 carried by the upper end of member 114 and projecting through an arcuate slot 118 in the separating plate 110 into the coin chute 106 will cause such second inserted coin to travel down the coin chute 107 which, as shown in Figure 20, is offset from the plane of the chute 106 for delivering the coin into the central coin passage 109. The offsetting of the chute 107 may be effected, as disclosed in Figures 20 and 21, by forming offset tabs 117 in the two adjacent dividing members 110. A coin passing through the chute 107 is directed, as stated, into the coin passage 109 which has its upper end disposed adjacent the upper end of the dial 105 whereby such second inserted coin indicated by the letter B in Figure 21 will be arrested due to its contact with the coin moving member 101 in the position shown in said figure, that is, where the upper periphery registers with the graduation 120 of the scale. Such coin B immediately starts its downward movement under the control of the coin moving member 101 and, due to the peripheral velocity of the coin moving member, such coin will reach the zero position on the dial after a parking period of 120 minutes. It will thus be seen that unless the member 111 is retained in the position shown in Figure 21 by a coin the spring 112 will shift the coin deflector 116 over to the position shown in Figure 23 and a subsequently inserted coin will thus travel down the chute 106 to the position indicating an available parking period of 60 minutes, or any other unit period.

It will be obvious that in any of the above described modifications if a unit parking period of 30 minutes is desired the foregoing described structures may be used and the only change necessary will be to double the peripheral velocity of the coin moving means. In such instances, of course, the insertion of a 1 cent piece would provide a parking period of 6 minutes and five such coins inserted, one immediately after the other, would accord a parking period of 30 minutes, while the insertion of a 5 cent piece in the meter would likewise provide a 30 minute parking period. The insertion of two such coins, one immediately after the other, would, of course, provide a parking period of 60 minutes.

In each of the described modifications a coin under control of the respective coin moving member preferably is visible from either side of the casing and hence the glazed sight openings on each side of the casing adjacent the respective scales or dials are provided. In the form of the invention shown in Figures 18 to 25, inclusive, such arcuate glazed sight openings are indicated by the numeral 118. In all of the modifications the coins, after passing through the respective coin passages, may be deposited in suitable coin receptacles and the movement of such coins so deposited registered on counting devices such as are shown in the embodiment of the invention illustrated in Figures 1 to 5, inclusive.

The scales or dials may be provided with graduations below the zero graduation, if desired, for marking additional parking periods, one, for example, representing five minutes of permissible over-parking, and colored amber if desired, while the lower one, which may be colored red, may indicate non-permitted over-parking.

In all the forms of the invention above described, the coins, whether of one denomination or another, are rolled downwardly along the inner faces of the spacing members of their respective passages at uniform velocity by reason of the contact of the peripheries of the coins with the moving members, the width of the passages being determined by the diameter of the respective coins. These spacing members and the associated plates, such as the spacing members 26b, 36b, and plates 26a, 36a, of Figure 8, constitute tracks which guide the coins during those ranges or distances through which they are moved by the coin moving members. Whether two such passages are provided or three of the same, but one coin moving member need be provided in any instance since the width of the respective member is sufficient to span the open faces of the associated coin passages.

While we have shown and described certain embodiments of our improvements for the purpose of illustrating the principle thereof, we do not wish to be restricted specifically to the forms shown and described, since variations in the details thereof may be resorted to without departing from the spirit of the invention.

We claim:

1. A parking meter comprising a casing provided with a sight opening for displaying inserted coins, means comprising a member adapted to engage and move an inserted coin in visual relation with respect to said opening through a given distance and at a velocity to define a parking period, a chute for directing such inserted coin into a position for engagement by said moving member at the beginning of said parking period, and mechanism for preventing the delivery of a second inserted coin to a position for engagement by said moving member during a portion of the foregoing parking period.

2. A parking meter comprising a casing provided with a sight opening for exhibiting inserted coins, means comprising a member adapted to engage and move an inserted coin in visual relation with respect to said opening through a given range within a predetermined time interval for defining a parking period, a chute for receiving inserted coins and adapted to direct the same successively into a position for engagement by said member, and coin arresting means in said chute for preventing the delivery by said chute of a second coin into a position for engagement by said member while a previously inserted coin is moving through a particular portion of said range.

3. A parking meter comprising a casing provided with a sight opening for exhibiting inserted coins, means comprising a coin moving member for engaging a coin and moving the same in visual relation with respect to said opening through a given range within a predetermined interval for defining a parking period, a chute for receiving inserted coins for delivering the same successively into position for engagement by said moving member, coin arresting means disposed adjacent and operable within said chute for preventing delivery of a coin into said position by said chute while a previously inserted coin is being moved through a portion of said range, and means operable by said last mentioned coin upon movement of the same from said portion of the range for actuating said coin arresting means to effect the discharge by said arresting means of a second inserted coin into a position for engagement by said coin moving member.

4. A parking meter comprising a casing having a sight opening, a coin receiving chute down which inserted coins are movable gravitationally to a position for engagement by a coin engaging and moving member, means comprising a coin engaging and moving member adapted to move a coin in visual relation with respect to said opening from said position and through a given range within a predetermined interval for defining a parking period, coin arresting means disposed adjacent said chute for operation by a coin in the initial position of said range for preventing movement of a second inserted coin from said chute into a position of engagement by said moving member, and means comprising a coin operable member disposed within the chute for operation by said first coin moving through the final portion of said range for operating said coin arresting means to effect release of said second inserted coin to effect the discharge of the same into a position for engagement by the coin moving means.

5. A parking meter comprising a casing provided with a sight opening, coin moving means comprising a member for moving coins along said opening at a predetermined velocity, a pair of coin delivery passages in the casing, a coin receiving opening in the casing communicating with said passages, one of said passages being arranged for directing an inserted coin to a given position with respect to said coin moving member constituting the starting point for the movement of the coin through a range defining a parking period of predetermined duration, and means controlled by a coin while in a given initial portion of said range for directing a subsequently inserted coin through said other passage for conduction thereby to a second position of engagement by said moving member and constituting the starting point of a range of movement of said second coin defining a parking period of greater duration.

6. A parking period indicator comprising a coin track, coin moving means disposed adjacent said track for engaging the peripheries of coins disposed between said moving member and the track for moving the coins along the track through predetermined ranges within predetermined intervals for measuring parking periods, a coin chute provided with two branches for delivering coins to said track at two predetermined positions constituting starting positions for ranges of movement corresponding to parking periods of different durations, the arrangement of said chute branches being such that coins inserted in the chute normally pass into the branch communicating with the starting position of the shorter range of movement, and means comprising a member engageable with and operable by a coin moving along the track during an initial portion of the period of shorter duration for causing a second coin inserted in the chute during such initial portion to be delivered by said other branch to said other starting position for measuring a parking period of greater duration.

7. A parking meter comprising a rotatable coin moving member, means providing a coin passage adjacent a portion of the periphery of said member adapted to receive coins and retain the same in contacting relation with said moving member whereby the coins are advanced along the passage, a coin chute provided with a pair of branches communicating with said passage at spaced points each constituting the starting position for a coin adapted to be moved within said passage by said moving member through a given range within a given interval for measuring a parking period, coin deflecting means associated with said branch chutes arranged normally to cause an inserted coin to be delivered to the starting position of the range corresponding to the shorter of the parking periods, and a member in said passage engageable by a coin moving within said shorter range for actuating said coin deflecting means for causing a second coin inserted in said chute while said first coin is in engagement with said member to be delivered to said other starting position in said passage.

8. A parking meter comprising a rotatable coin moving member, means providing a coin passage adjacent a portion of the periphery of said member for receiving coins and retaining the same in driven engagement with said moving member, a coin chute for inserted coins provided with branches communicating with said passage at separated points each constituting the starting position for a coin drivable by said moving member along said passage at a velocity and through a range defining a parking period of a duration proportional to the length of the respective range, and means for effecting the delivery to the starting position of the greater of said ranges of a coin inserted within said chute during a portion of a period during which a coin is being driven through the shorter range.

9. A parking meter comprising a casing provided with a coin exhibiting opening, a coin chute for delivering an inserted coin into a position of engagement with means for engaging and moving a coin, means for engaging a coin inserted in said chute and moving the same in visual relation with respect to said opening at a given velocity and throughout a given range for measuring a parking period, and means operative by a coin during a portion of a parking period for delivering a second coin inserted in said chute during a portion of the parking period into a different position of engagment with said moving means, said last mentioned position being spaced from the position of engagement of said first coin whereby the movement of said second coin in visual relation with respect to said opening will define a second parking period consecutive with respect to the period defined by the first inserted coin.

10. A parking meter comprising a casing provided with a coin exhibiting opening in visual relation with respect to which coins are adapted to be moved at predetermined velocity and throughout such range or ranges as to define visually a parking period or periods of given durations, means in said casing for engaging and so moving a coin or coins, a coin receiving opening in the casing, means for conducting a coin from said receiving opening into a position for engagement by said moving means, and means controlled by a coin in engagement with said moving means for effecting the engagement of a second inserted coin by said moving means in a position so spaced from the position of engagement of said first coin that said second coin will be caused to move through a visible range greater than the range of said first coin for measuring a parking period commensurate with the value of the two coins.

11. A parking meter comprising a casing having a sight opening for displaying inserted coins, a pair of coin chutes for receiving different sizes of coins, a pair of coin tracks adjacent said sight opening in the casing, each of said tracks being associated with one of said chutes for receiving coins therefrom and arranged to arrest the same at different initial positions with respect to said sight opening, and common means for engaging a coin in either of said tracks for moving the same from the initially delivered position through a given range in visual relation with respect to said sight opening and within a predetermined interval for defining a parking period of a duration correlative to the value of the displayed coins.

12. A parking meter comprising a casing having receiving means for coins, a sight opening for exhibiting the inserted coins, means for engaging and moving the inserted coins at a given velocity along said sight opening in visible relation with respect thereto, and means for initially conducting inserted coins according to their sizes to predetermined different positions of engagement by said moving means for movement thereby through ranges defining parking periods each of a duration correlative to the value of the inserted coin.

13. A parking meter comprising a casing provided with an elongated coin exhibiting opening, a coin moving member within said casing, a coin guiding track member adjacent a portion of the periphery of said coin moving member and arranged to support and guide a plurality of coins along said sight opening, a coin receiving chute in said casing and arranged to deliver coins to said track member at one end of said sight opening, shoulder means associated with said track and coin moving members and disposed adjacent the opposite end of said sight opening for arresting initial movement of a coin in said track opposite a predetermined portion of said sight opening for continued movement therealong by said coin moving member, and means also associated with said track member and coin moving member and arranged in vertically spaced relation with respect to said shoulder means for retarding the movement of coins toward said shoulder means.

DAVID C. ROCKOLA.
ARVID DAHLSTROM.